United States Patent
Boetsch

(10) Patent No.: US 12,498,021 B2
(45) Date of Patent: Dec. 16, 2025

(54) TENSIONING SPROCKET TO BE APPLIED TO THE ROW OF A CORN HEADER

(71) Applicant: BPB Mediterranea S.A., Villa Maria (AR)

(72) Inventor: Gustavo Alejandro Boetsch, Villa Maria (AR)

(73) Assignee: BPB Mediterranea S.A., Villa Maria (AR)

( * ) Notice: Subject to any disclaimer, the term of this patent is extended or adjusted under 35 U.S.C. 154(b) by 0 days.

(21) Appl. No.: 18/365,354

(22) Filed: Aug. 4, 2023

(65) Prior Publication Data

US 2024/0044395 A1    Feb. 8, 2024

(30) Foreign Application Priority Data

Aug. 4, 2022  (AR) ............................ M20220102089
Jul. 26, 2023  (AR) ............................ M20230101957

(51) Int. Cl.
*F16H 19/06*         (2006.01)

(52) U.S. Cl.
CPC ................................ *F16H 19/0672* (2013.01)

(58) Field of Classification Search
CPC .... F16D 1/072; F16H 2055/185; F16H 55/14; F16H 55/12; F16H 57/0031; A01D 45/023; A01D 45/025; A01D 45/021
See application file for complete search history.

(56) References Cited

U.S. PATENT DOCUMENTS

| 5,536,101 | A  * | 7/1996 | Schwarzler | F16D 1/116 |
| | | | | 403/359.5 |
| 10,058,027 | B2 * | 8/2018 | Gessel | A01D 34/015 |
| 11,353,064 | B2 * | 6/2022 | Chaillou | F16D 1/0858 |
| 11,505,239 | B2 * | 11/2022 | Suzuki | F16C 19/183 |
| 2017/0356541 | A1 * | 12/2017 | Skrobowski | F16C 33/586 |

* cited by examiner

*Primary Examiner* — Gregory Robert Weber
(74) *Attorney, Agent, or Firm* — The Morales Law Firm; Joseph L. Morales, Esq.

(57) ABSTRACT

A tensioning sprocket designed to be mounted on the frame or row of a corn header of the type consisting of a control box (8) on which two drive gears (6) and (7) are mounted that generate the linear movement at the lifting chains (1) and (2), which maintain their adequate tension by action of the pair of tensioning sprockets (9) and (10) that are arranged on respective bearings (12) mounted on the appropriate carrier arms (11), wherein each tensioning sprocket includes an annular step (16) adjacent to its upper face; wherein each tensioning sprocket includes a annular embossment that defines a continuous circumferential line (17).

4 Claims, 4 Drawing Sheets

TENSIONING SPROCKET TO BE APPLIED TO THE ROW OF A CORN HEADER

CROSS-REFERENCE TO RELATED APPLICATIONS

The present application claims priority from Argentinean Applications AR M20230101957 filed on Jul. 26, 2023, and AR M20220102089 filed on Aug. 4, 2022, which are both incorporated herein by reference in their entirety.

FIELD OF THE INVENTION

The present invention, refers to sprocket and, more specifically, to a tensioning sprocket to be applied to the row of a corn header.

BACKGROUND OF THE INVENTION

As it is known per se, the corn header is the means that harvesting machines have to separate the spike from the rest of the plant and enter it inside.

A conventional corn header comprises side-by-side row units, each including a frame or row supporting a pair of gathering chains to guide the corn stalks to feed rolls which operate to break the ears from the stalks, which remain attached to the ground.

In general terms, a corn header is made up of tips, whose purpose is to guide or direct the plants towards the lifting chains and husking rollers; lifting chains, whose function is to transport the spikes to the screw conveyor; gleaning rollers, two per row, which rotate concentrically, pulling the plant downwards, to prevent it (or parts of it) from entering the harvester together with the spike.

The tensioning sprocket to which this invention refers belongs to the type of those that are mounted in what is called the row of a corn header. Said row consists of a control or drive box on which two drive sprockets are mounted at one end, which, when rotating on their axis in the opposite direction, provide a linear movement to the lifting chains. Said chains maintain their tension by the action of two tensioning sprockets that are arranged at the other end, each one of which is mounted on a respective carrier arm that, when moving longitudinally to the row, allows adjusting the tension of the aforementioned lifting chains that extend between both pairs of sprockets.

As it is known per se, the tensioning sprockets are mounted (nailed) on bearings, and the bearings on respective axes linked to each carrier arm, so as to allow relative rotation between the sprockets and the axis that links them to each arm.

Currently, the mounting of the bearings in the tensioning sprockets is performed by means of interference and/or the use of some adhesive, and the tensioning sprocket plus bearing assembly is fixed to the tensioning arm by means of a bolt with an adjustment nut that acts as an axis.

It should be noted that, currently, each tensioning sprocket has, in its design, an annular step that is defined adjacent to its upper face, its purpose being to prevent the sprocket from falling or moving downwards, during its assembly and also during its operation.

Conventionally, this type of sprocket has a respective physical blocking resource or means in the opposite direction, that is, being defined in correspondence with the lower face of the same sprocket.

It has been verified that, on occasions, the lifting chains when operated, exert forces on the sprocket which, since it does not have a stop in its upward movement, disengages from the bearing, causing the chain to work misaligned, or in the worst case, to disengage and severely damage the drive box.

In order to avoid said movement, a tensioning sprocket has been developed that incorporates a locking means that is defined on its lower face and consists of the presence of a plurality of point plastic deformations that forms an annular embossment arranged along a circumference that is defined on its lower face, which is the face where the bearing is mounted.

In this way, with the presence of said point deformations, the movement of the sprocket upwards is blocked, thus solving the previously mentioned problem.

In preferred embodiments, the aforementioned annular embossments are achieved through point pressure at various points on the circumference of said lower face of the sprocket.

In the manner set forth, through the aforementioned plurality of point plastic deformations that forms an annular embossment, the blocking of the bearing inside the sprocket is achieved, preventing axial movement between them.

It is an appropriate solution due to the limited space available. In this sector it is not possible to incorporate a "seeger" type retaining ring, or some other equivalent means, because all of them require additional space that is not available, since the sprocket should be moved upwards, raising the chain and impairing its proper operation.

BRIEF SUMMARY OF THE INVENTION

In this particular case, the novelty that the present invention incorporates lies in the fact that an embossed line is incorporated on the lower face of the sprocket that can be made up of segments forming an annular line, up to a continuous circumferential flange that replaces the aforementioned crown of point deformations defined on said lower face.

It can be affirmed that it is a novel constructive modification incorporated, through which the assembly of the bearing is simplified and optimized.

This assembly advantage is useful both in the factory when the header is made, and especially when the user himself is the one who reassembles for any repair.

BRIEF DESCRIPTION OF THE DRAWINGS

In order to specify the briefly commented advantages, to which users and those skilled in the art can add many others, and to facilitate the understanding of the constructive, constitutive and functional features of the invented tensioning sprocket, a preferred example embodiment is described below that is illustrated, schematically and without a point scale, in the attached sheets, with the express clarification that, precisely since it is an example, it is not appropriate to assign to it a limiting or exclusive character of the scope of protection of the present invention, but it simply has the purpose of merely explaining and illustrating the basic conception on which it is based.

It is explained that, in all the figures, the same reference numbers and letters correspond to the same or equivalent parts or constituent elements of the assembly, according to the example chosen for the present explanation of the invented tensioning sprocket.

DETAILED DESCRIPTION OF THE INVENTION

Figure 1:
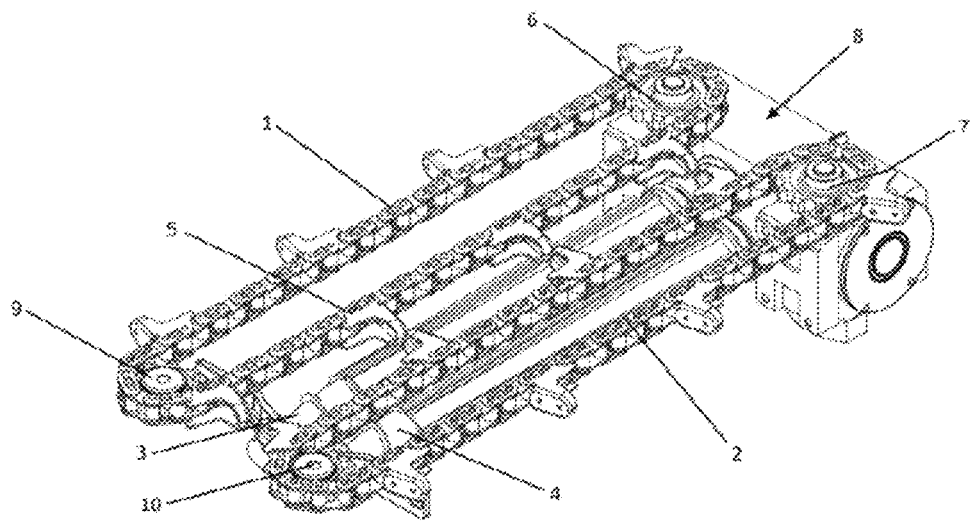
FIG. 1 is an elevation perspective that represents a gathering unit or row of a corn header.
Figure 2:
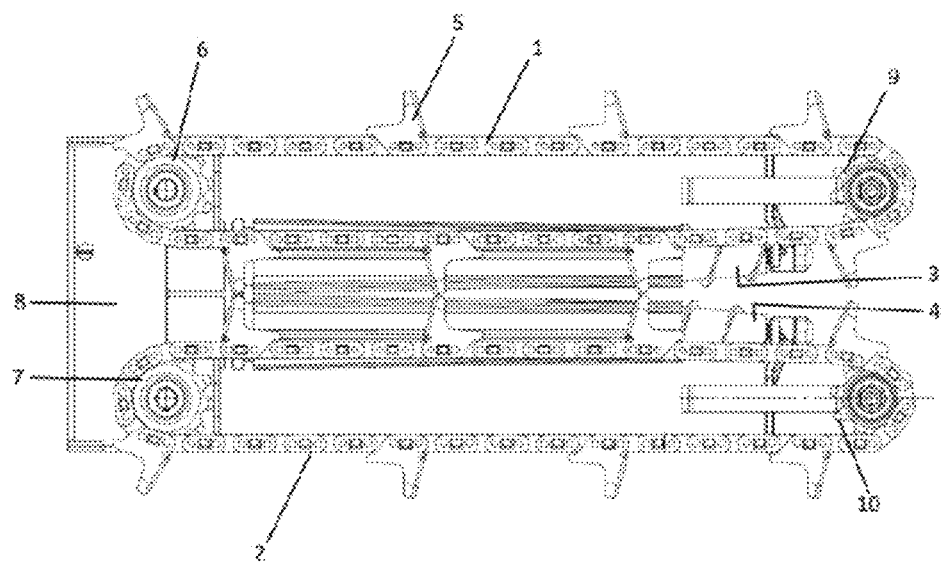
FIG. 2 is a plan view of the same row as the previous figure.

The tensioning sprocket to be applied to the row of a corn header is distinguished because it includes a new annular embossment, through which the anchorage in its assembly in the row body of a corn header is improved.

More specifically, the present invention refers to the tensioning sprocket that is fixed by being mounted on an appropriate bearing, which has the particularity of including an annular embossment applied to its lower face.

In previous embodiments, said annular embossment is seen in the presence of a crown of point deformations arranged along the circumference of the lower face of the sprocket, which constitutes the face that is mounted on the bearing.

These point deformations have the purpose of blocking the movement of the sprocket upwards, ensuring a precise and stable anchorage since any undue movement is avoided.

In this particular case, the aforementioned annular embossment is modified to define an embossing that is no longer one consisting of point deformations to define segments, even a continuous flange that covers the entire circumference of the lower face of the sprocket itself.

It can be seen that it is an improvement through which an alternative is defined to cover, no longer on a crown basis, the aforementioned plastic deformation that is carried out on the piece, which takes the entire periphery forming a continuous flange that replaces the aforementioned plurality of point deformations.

The advantage achieved with this constructive modification lies, above all, in that the sprocket can be more easily adapted to different production processes depending on the methodologies used from the manufacturing perspective and its adaptability to each model.

It is also highlighted that with the aforementioned modification, the assembly of the sprocket in the row of the header is more efficient, simple and durable, ensuring that an efficient anchorage will always be achieved.

As can be seen in the first two figures, a conventional corn header includes a header frame or row that is basically made up of a pair of lifting chains (1) and (2), carrying the spoons (5), which are arranged in a higher plane than a pair of feed rollers (3) and (4).

In both figures it can be seen that said lifting chains extend between a pair of drive sprockets (6) and (7) arranged at the proximal end of the control box (8), and a pair of tensioning sprockets (9) and (10) arranged at a distal end with respect to the same control box (8).

Figure 3:
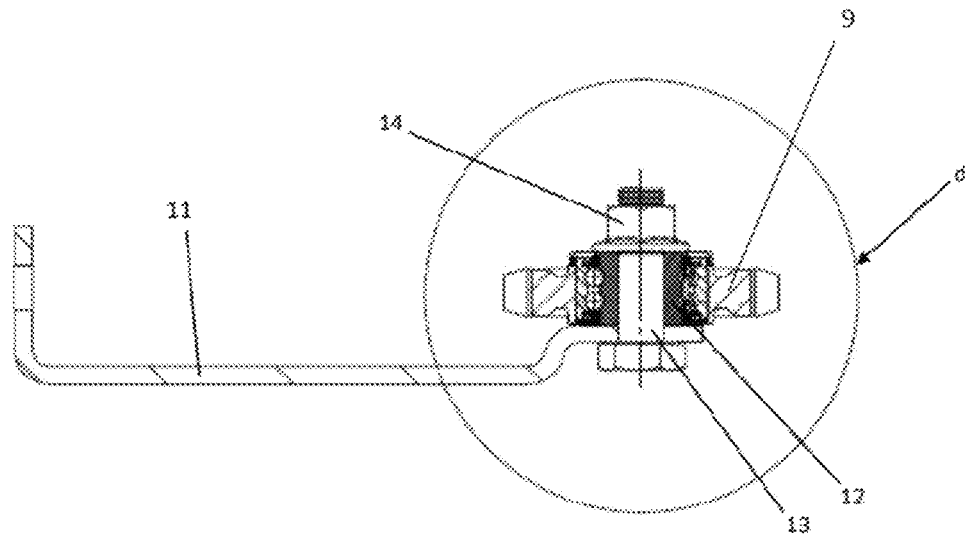
FIG. 3 is a vertical sectional view showing the arm carrying the tensioning sprocket that integrates the row of a corn header.
Figure 4:
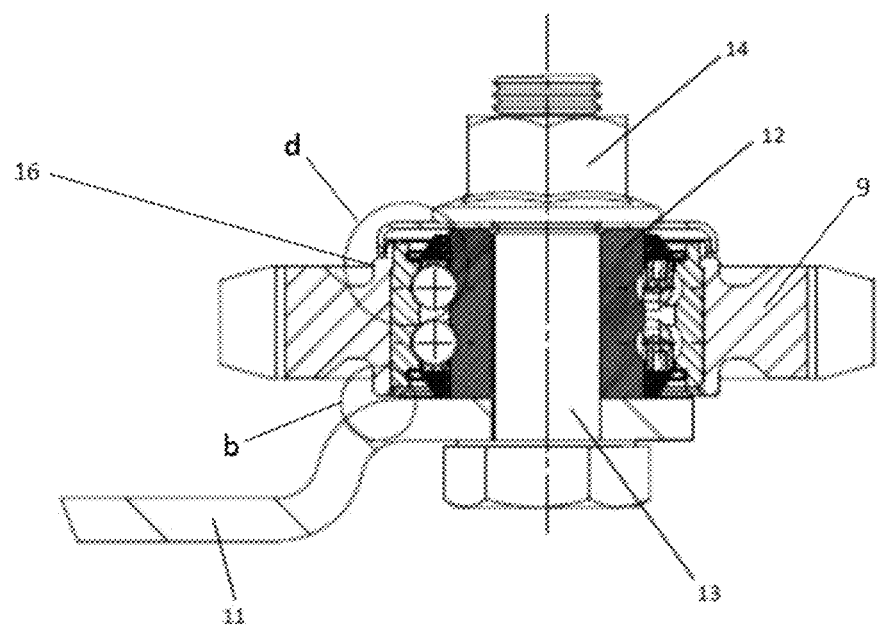
FIG. 4 is the same vertical section of the previous figure, enlarged where a detail (b) and a detail (d) stand out.
Figure 5:
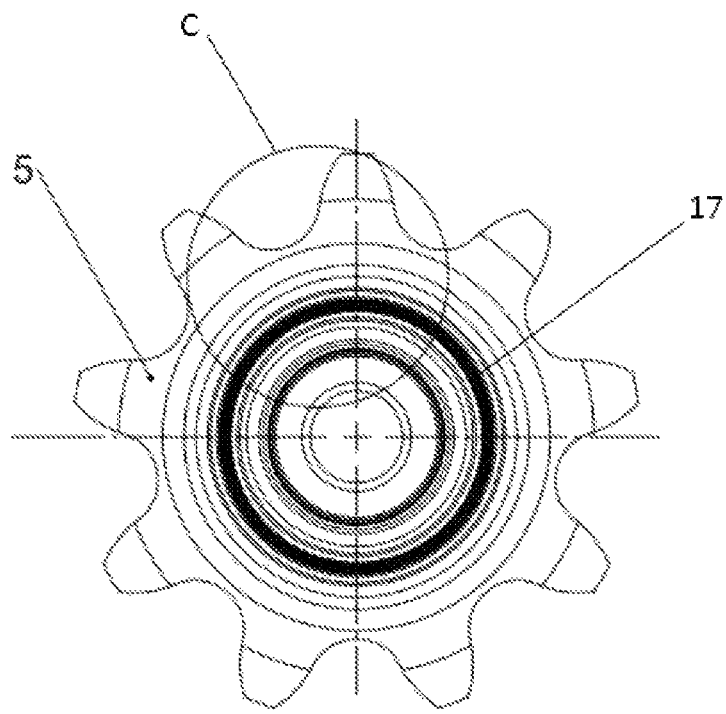
FIG. 5 is a schematic plan view, taken from the underside of the tensioning sprocket of this invention, where a detail (c) is indicated.
Figure 6:
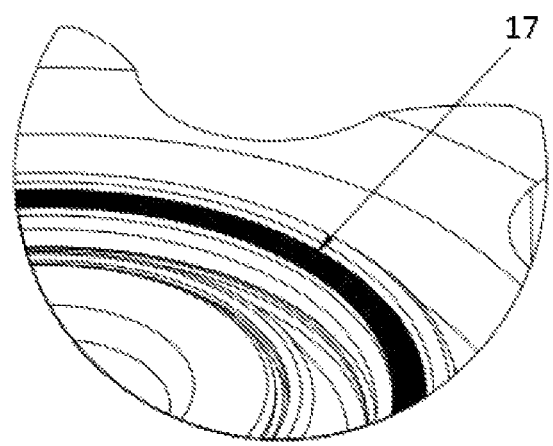
FIG. 6 is an enlarged detail, highlighted with the letter (c) in FIG. 5.

With the rotation of the drive sprockets in the direction opposite to the movement of the material being conveyed, the linear movement is generated, longitudinally to the row, of both lifting chains (1) and (2) for which they must be duly taut by action of the aforementioned tensioning sprockets (9) and (10), which are arranged mounted on respective carrier arms (11) (visible in FIGS. 3 and 4).

Observing now FIGS. 3 and 4 it is possible to understand how each tensioning sprocket is assembled, including the presence of an annular embossment or embossing that is incorporated according to the improvement highlighted by the present invention.

In these three figures, it can be seen that each tensioning sprocket is arranged nailed to a appropriate bearing (12) mounted on the vertical axis that is formed by means of a bolt (13) with an adjustment nut (14) that is fixed at the end of said carrier arm (11).

Figure 7:
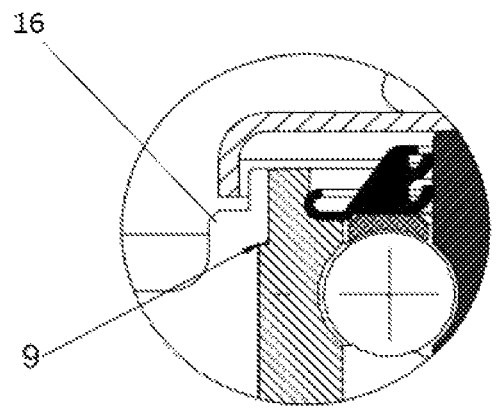
FIG. 7 is an enlarged detail, highlighted with the letter (d) in FIG. 4.
Figure 8:
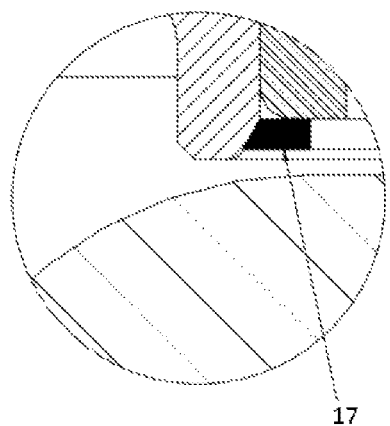
FIG. 8 is an enlarged detail, highlighted with the letter (b) in FIG. 4.

As can be seen specifically in FIGS. 4 and 7, these tensioning sprockets (9) present in their original design an annular step (16) adjacent to their upper face, the purpose of which is to prevent it from falling or moving downwards.

Observing now FIGS. 5 to 8, it is possible to understand which is the constructive modification incorporated into the body of the tensioning sprocket, in this case represented with reference (9), mounted on the bearing (12). The presence of a circumferential line of annular embossment (17) that extends adjacent to its internal perimeter edge is shown.

With the presence of this annular embossment (17), the bearing (12) is locked inside the sprocket (9), preventing axial movement between them.

In addition, it confers an improvement in the assembly since, in this way, the face that goes downwards is easily identifiable.

Having described and exemplified the nature and main object of the present invention, as well as the way in which it can be put into practice, it is declared that it is claimed as property and exclusive right:

1. A tensioning sprocket device, comprising:
    a tensioning sprocket having a lower face with an internal perimeter edge having an adjacent annular embossment;
    said annular embossment determining a mechanical interference with a bearing housed therein and defining a passive structural stop suitable for axially retaining said baring in position, said bearing mounted on a vertical shaft fixed at one end of a carrier arm arranged at a distal end in relation to a corresponding drive sprocket.

2. The tensioning sprocket device according to claim 1, wherein said annular embossment defines a continuous circumferential line along the internal perimeter edge, constituting a structural stop that axially limits the displacement of said bearing housed in a central bore.

3. The tensioning sprocket device according to claim 1, wherein said annular embossment is formed by a plurality of segments arranged one after the other following a circumferential path on the continuous circumferential line, constituting a structural stop that axially limits the displacement of said bearing housed in a central bore.

4. The tensioning sprocket device according to claim 1, wherein a respective lifting chain connects said tensioning sprocket to a drive sprocket.

\* \* \* \* \*